(12) United States Patent
Poast et al.

(10) Patent No.: US 7,946,628 B2
(45) Date of Patent: *May 24, 2011

(54) TUBULAR METAL FITTING EXPANDABLE IN A WALL OPENING AND METHOD OF INSTALLATION

(75) Inventors: Tom G. Poast, Seattle, WA (US); Dean C. Madden, Coppell, TX (US); Mark R. Weiss, Seattle, WA (US)

(73) Assignee: Fatigue Technology, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/259,927

(22) Filed: Oct. 28, 2008

(65) Prior Publication Data

US 2009/0224535 A1 Sep. 10, 2009

Related U.S. Application Data

(63) Continuation of application No. 10/633,294, filed on Jul. 31, 2003, now Pat. No. 7,448,652.

(51) Int. Cl.
*F16L 3/04* (2006.01)
(52) U.S. Cl. .................. 285/136.1; 285/382.4; 285/222
(58) Field of Classification Search .............. 285/140.1, 285/139.3, 382.4, 382.5, 136.1, 214, 222
See application file for complete search history.

(56) References Cited

U.S. PATENT DOCUMENTS

| 295,593 A | 3/1884 | Thayer |
|---|---|---|
| 810,430 A | 1/1906 | Pfluger et al. |
| 1,081,496 A | 12/1913 | Gillmor |
| 1,106,964 A | 8/1914 | Pahler |
| 1,226,090 A | 5/1917 | Ludlum |
| 1,297,142 A | 3/1919 | Gibbons |
| 1,480,298 A | 1/1924 | Pearson |

(Continued)

FOREIGN PATENT DOCUMENTS

DE 2203217 7/1973

(Continued)

OTHER PUBLICATIONS

Merriam Webster's Collegiate Dictionary, Tenth Edition, 1997, p. 154. (1).

*Primary Examiner* — David E Bochna
(74) *Attorney, Agent, or Firm* — Seed Intellectual Property Law Group PLLC

(57) ABSTRACT

A fitting (58) is inserted into an opening (56) in a wall (50). The fitting (58) includes a ring portion (64) where it extends through the opening (56). It also includes one or two end portions (66, 68) that extend axially outwardly from the ring portion (64). The ring portion (64) has an inside diameter (76) that is smaller than the inside diameters of the end portion or portions (66, 68). The fitting (58) is positioned within the wall opening (56). Then, an expansion tool is moved through the interior of fitting (58) for the purpose of expanding the ring portion (64). The ring portion (64) is expanded to such an extent that it makes a tight fit with the opening (56). Also, the degree of expansion may result in a cold working of the wall material surrounding the opening (56). The expansion tooling only expands the ring portion (64) and does not exert a substantial expanding force on the end portions (66, 68).

31 Claims, 9 Drawing Sheets

U.S. PATENT DOCUMENTS

| | | | |
|---|---|---|---|
| 1,881,867 A | 10/1932 | Nelson | |
| 1,979,686 A | 11/1934 | Hall et al. | 85/40 |
| 2,092,358 A | 9/1937 | Robertson | |
| 2,146,461 A | 2/1939 | Bettington | 218/29 |
| 2,150,361 A | 3/1939 | Chobert | |
| 2,188,596 A | 1/1940 | Hobert | 16/2 |
| 2,275,451 A | 3/1942 | Maxwell | 29/157.5 |
| 2,357,123 A | 8/1944 | Maxwell | 153/80.5 |
| 2,385,294 A | 9/1945 | Lowy | 16/3 |
| 2,405,399 A | 8/1946 | Bugg et al. | 153/80 |
| 2,430,554 A | 11/1947 | Bugg et al. | 153/80 |
| 2,433,425 A * | 12/1947 | Burckle | 285/148.16 |
| 2,468,985 A | 5/1949 | Krotz | 287/85 |
| 2,528,180 A | 10/1950 | Roehl | 248/56 |
| 2,661,182 A | 12/1953 | Kipp | 251/76 |
| 2,672,175 A | 3/1954 | Howard | 153/80 |
| 2,695,446 A | 11/1954 | Meyer | |
| 2,700,172 A | 1/1955 | Rohe | 16/2 |
| 2,808,643 A * | 10/1957 | Weatherhead, Jr. | 29/508 |
| 2,943,667 A | 7/1960 | Ewing et al. | 153/80 |
| 3,128,999 A | 4/1964 | Schmitt | 267/1 |
| 3,137,887 A | 6/1964 | Mannino et al. | 16/2 |
| 3,149,860 A | 9/1964 | Hallesy | |
| 3,164,054 A | 1/1965 | Biesecker | 85/8.8 |
| 3,244,034 A | 4/1966 | Severdia | 77/62 |
| 3,252,493 A | 5/1966 | Smith | 151/41.7 |
| 3,345,730 A | 10/1967 | Laverty | 29/243.52 |
| 3,358,492 A | 12/1967 | Richter | 72/393 |
| 3,434,746 A * | 3/1969 | Watts | 285/140.1 |
| 3,498,648 A | 3/1970 | Hallesy | |
| 3,537,163 A | 11/1970 | Steidl | 29/149.5 |
| 3,566,662 A | 3/1971 | Champoux | 72/370 |
| 3,674,292 A | 7/1972 | Delmer, Sr. | |
| 3,693,247 A | 9/1972 | Brown | 29/512 |
| 3,778,090 A | 12/1973 | Tobin | |
| 3,787,945 A | 1/1974 | Pasek et al. | |
| 3,820,297 A | 6/1974 | Hurd | 52/758 F |
| 3,835,525 A | 9/1974 | King, Jr. | 29/412 |
| 3,875,649 A | 4/1975 | King, Jr. | 29/418 |
| 3,892,121 A | 7/1975 | Champoux et al. | 72/370 |
| 3,895,409 A | 7/1975 | Kwatonowski | 16/2 |
| 3,915,052 A | 10/1975 | Ruhl | 85/7 |
| 3,934,325 A | 1/1976 | Jaffe | 29/243.52 |
| 3,949,535 A | 4/1976 | King, Jr. | 52/758 D |
| 3,997,193 A | 12/1976 | Tsuda et al. | 285/47 |
| 4,143,580 A | 3/1979 | Luhm | 85/77 |
| 4,164,807 A | 8/1979 | King, Jr. | 29/523 |
| 4,187,708 A | 2/1980 | Champoux | 72/30 |
| 4,249,786 A | 2/1981 | Mahoff | |
| 4,355,612 A | 10/1982 | Luksch | 123/41.08 |
| 4,386,515 A | 6/1983 | Starke | 72/391 |
| 4,397,061 A | 8/1983 | Kanzaka | 16/2 |
| 4,405,256 A | 9/1983 | King, Jr. | 403/408 |
| 4,423,619 A | 1/1984 | Champoux | 72/393 |
| 4,425,780 A | 1/1984 | Champoux | 72/370 |
| 4,447,944 A | 5/1984 | Mohrman | 29/512 |
| 4,471,643 A | 9/1984 | Champoux et al. | 72/391 |
| 4,482,089 A | 11/1984 | Lindahl et al. | 228/173 C |
| 4,522,378 A | 6/1985 | Nelson | 267/141.4 |
| 4,524,600 A | 6/1985 | Champoux et al. | 72/391 |
| 4,530,527 A | 7/1985 | Holmberg | |
| 4,557,033 A | 12/1985 | Champoux | 29/525 |
| 4,583,388 A | 4/1986 | Hogenhout | 72/393 |
| 4,597,282 A | 7/1986 | Hogenhout | 72/370 |
| 4,640,479 A | 2/1987 | Shely et al. | 248/56 |
| 4,665,732 A | 5/1987 | Hogenhout | |
| 4,699,212 A | 10/1987 | Andersson et al. | 165/167 |
| 4,759,237 A | 7/1988 | Fauchet et al. | 81/53.2 |
| 4,787,793 A | 11/1988 | Harris | 411/339 |
| 4,809,420 A | 3/1989 | Landy et al. | 29/523 |
| 4,869,091 A | 9/1989 | Shemeta | 72/393 |
| 4,885,829 A | 12/1989 | Landy | 29/156.8 R |
| 4,905,766 A * | 3/1990 | Dietz et al. | 169/91 |
| 4,934,038 A | 6/1990 | Caudill | 29/523 |
| 4,934,170 A | 6/1990 | Easterbrook et al. | 72/370 |
| 4,985,979 A | 1/1991 | Speakman | 29/512 |
| 4,999,896 A | 3/1991 | Mangus et al. | 29/34 B |
| 5,038,596 A | 8/1991 | Noonan et al. | 72/391.4 |
| 5,069,586 A | 12/1991 | Casey | 411/339 |
| 5,083,363 A | 1/1992 | Ransom et al. | 29/523 |
| 5,093,957 A | 3/1992 | Do | 16/2 |
| 5,096,349 A | 3/1992 | Landy et al. | |
| 5,103,548 A | 4/1992 | Reid et al. | 29/507 |
| 5,110,163 A | 5/1992 | Benson et al. | |
| 5,127,254 A | 7/1992 | Copple et al. | 72/370 |
| 5,129,253 A | 7/1992 | Austin et al. | 72/370 |
| 5,207,461 A * | 5/1993 | Lasko | 285/222 |
| 5,218,854 A | 6/1993 | Jarzebowicz et al. | |
| 5,245,743 A | 9/1993 | Landy et al. | |
| 5,253,773 A | 10/1993 | Choma et al. | |
| 5,305,627 A | 4/1994 | Quincey et al. | 72/370 |
| 5,341,559 A | 8/1994 | Reid et al. | 29/523 |
| 5,380,111 A | 1/1995 | Westrom | 402/74 |
| 5,380,136 A | 1/1995 | Copple et al. | 411/183 |
| 5,390,808 A | 2/1995 | Choma et al. | |
| 5,405,228 A | 4/1995 | Reid et al. | 411/183 |
| 5,433,100 A | 7/1995 | Easterbrook et al. | 72/391.2 |
| 5,466,016 A | 11/1995 | Briody et al. | |
| 5,478,122 A * | 12/1995 | Seabra | 285/281 |
| 5,607,194 A * | 3/1997 | Ridenour | 285/334.5 |
| 5,609,434 A | 3/1997 | Yehezkieli et al. | 403/260 |
| 5,713,611 A | 2/1998 | Kurimoto et al. | |
| 5,722,312 A | 3/1998 | Kristensen | 92/171.1 |
| 5,806,173 A | 9/1998 | Honma et al. | 29/727 |
| 5,885,318 A | 3/1999 | Shimizu et al. | 65/493 |
| 5,943,898 A | 8/1999 | Kuo | 72/370.07 |
| 5,947,326 A | 9/1999 | O'Hern et al. | 220/802 |
| 6,058,562 A | 5/2000 | Satou et al. | 16/2.1 |
| 6,131,964 A | 10/2000 | Sareshwala | |
| 6,217,082 B1 * | 4/2001 | Orcutt et al. | 285/272 |
| 6,266,991 B1 | 7/2001 | Kuo | 72/370.07 |
| 6,289,577 B1 | 9/2001 | Tanaka et al. | 29/603.03 |
| 6,328,513 B1 | 12/2001 | Niwa et al. | 411/339 |
| 6,347,663 B1 * | 2/2002 | Hunzinger et al. | 165/178 |
| 6,488,460 B1 | 12/2002 | Smith et al. | 411/353 |
| 6,499,926 B2 | 12/2002 | Keener | 411/504 |
| 6,623,048 B2 * | 9/2003 | Castel et al. | 285/382 |
| 6,651,301 B1 | 11/2003 | Liu | 29/243.521 |
| 6,705,149 B2 | 3/2004 | Cobzaru et al. | 72/391.4 |
| 6,761,380 B2 | 7/2004 | Pachciarz et al. | |
| 6,773,039 B2 | 8/2004 | Muenster et al. | |
| 6,796,765 B2 | 9/2004 | Kosel et al. | 415/142 |
| 6,826,820 B2 | 12/2004 | Denham et al. | 29/524.1 |
| RE38,788 E | 9/2005 | Satou et al. | 16/2.1 |
| 7,024,908 B2 | 4/2006 | Poast et al. | 72/391.2 |
| 7,047,596 B2 | 5/2006 | Sucic et al. | 16/2.1 |
| 7,059,816 B2 | 6/2006 | Toosky | 411/181 |
| 7,100,264 B2 | 9/2006 | Skinner et al. | 29/523 |
| 7,375,277 B1 | 5/2008 | Skinner et al. | 174/18 |
| 7,406,777 B2 | 8/2008 | Grover et al. | 33/645 |
| 7,448,652 B2 * | 11/2008 | Poast et al. | 285/136.1 |
| 7,617,712 B2 | 11/2009 | Glenn | 72/391.4 |
| 2004/0111864 A1 | 6/2004 | Skinner et al. | 29/523 |
| 2007/0110541 A1 | 5/2007 | Rawlins et al. | 411/54.1 |
| 2007/0289351 A1 | 12/2007 | Glenn | 72/370.07 |
| 2008/0005887 A1 | 1/2008 | Glenn et al. | 29/523 |
| 2008/0034831 A1 | 2/2008 | Glenn | 72/370.07 |
| 2008/0066518 A1 | 3/2008 | Glenn et al. | 72/370.07 |
| 2008/0250603 A1 | 10/2008 | Skinner et al. | 16/2.2 |

FOREIGN PATENT DOCUMENTS

| | | |
|---|---|---|
| DE | 33 01 849 C1 | 7/1984 |
| DE | 3545554 A1 | 7/1987 |
| DE | 89 01 317 U1 | 3/1989 |
| EP | 0 054 592 A1 | 6/1982 |
| EP | 140516 A1 * | 5/1985 |
| EP | 0 248 122 A2 | 12/1987 |
| EP | 0 891 007 A1 | 1/1999 |
| EP | 0 945 919 B1 | 9/1999 |
| EP | 1166951 A1 | 1/2002 |
| EP | 1 202 458 A1 | 5/2002 |
| EP | 1525952 A1 | 4/2005 |
| EP | 1611976 A1 | 1/2006 |
| EP | 1 903 221 A2 | 3/2008 |
| FR | 2645052 | 10/1990 |
| GB | 593607 | 10/1947 |
| GB | 1395009 | 5/1975 |

| | | | | | | |
|---|---|---|---|---|---|---|
| GB | 2 239 917 A | 7/1991 | | JP | 2001-177964 | 6/2001 |
| JP | 50088619 | 7/1975 | | SU | 632463 | 11/1978 |
| JP | 57137031 | 8/1982 | | WO | 8400120 A1 | 1/1984 |
| JP | 60238046 A | 11/1985 | | WO | 2007082077 A1 | 7/2007 |
| JP | 61157846 | 7/1986 | | WO | 2007121932 A1 | 11/2007 |
| JP | 10-274366 | 10/1998 | | | | |

* cited by examiner

US 7,946,628 B2

TUBULAR METAL FITTING EXPANDABLE IN A WALL OPENING AND METHOD OF INSTALLATION

CROSS-REFERENCE TO RELATED APPLICATION

This application is a continuation of U.S. patent application Ser. No. 10/663,294, filed on Jul. 31, 2003, which issued Nov. 11, 2008 as U.S Pat. No. 7,448,652, the contents of which are incorporated herein by reference in its entirety.

TECHNICAL FIELD

The present invention relates to a fitting that fits in an opening in a wall and is expanded to secure it to the wall material surrounding the opening, and to installations that include such fitting and to methods of installing the fitting and making the installations.

BACKGROUND OF THE INVENTION

It is necessary at times to extend a conduit (e.g. fluid conduit, electrical conduit) through a wall, such as a bulkhead in an aircraft, for example. It is necessary that this conduit be firmly connected to the wall and at times be sealed against leakage, between it and the wall. It is an object of the present invention to provide a simple yet effective conduit installation composed of a fitting that is mounted in a single opening in the wall and conduit sections on one or both sides of the wall that are connected to the fitting, without there being any leakage from the conduit or between it and the wall.

An installation in which a conduit extends through a wall or bulkhead and is connected to a fitting that is connected to the wall is disclosed by U.S. Pat. No. 5,096,349, granted Mar. 17, 1992 to Michael A. Landry, Roger T. Bolstad, Charles M. Copple, Darryle Quincey, Eric T. Easterbrook, Leonard F. Reid and Louis A. Champoux. The system disclosed by this patent includes a fitting that has a tubular shank that fits into an opening in the wall and a head at one end of the shank that makes contact with the wall. The tubular shank is expanded into the opening. A conduit extends through a center opening in the fitting and is connected to the head of the fitting. An advantage of this installation is that only one opening in the wall is required. An object of the present invention is to use this advantage and combine with it other features which result in an improved installation.

BRIEF SUMMARY OF THE INVENTION

The present invention includes providing a tubular metal fitting that is insertable into a wall opening and expandable in the opening to connect it to the wall. The fitting includes a ring portion having a width that may be substantially equal to the wall thickness, an outer diameter that is snugly fittable within the wall opening, and an inner diameter that is separated from the outer diameter by a radius dimension. The fitting includes at least one elongated end portion projecting axially outwardly from the wall and ring portion. The end portion has an inside diameter that is larger than the inner diameter of the ring portion. The end portion has an outer end that is spaced axially outwardly from the ring portion. The ring portion is constructed from a metal that is expandable radially while the ring portion is in the opening in the wall. The ring portion is expanded an amount sufficient to create a tight interference fit between the outer diameter of the ring portion and the opening in a wall. The amount of expansion is sufficient to connect the tubular fitting to the wall.

In preferred form, the fitting has a first end portion extending axially outwardly from one side of the wall and a second end portion extending axially outwardly from the opposite or second side of the wall. The end portions of the fitting are adapted to be connected to end portions of conduit sections. A first conduit section is on the first side of the wall and is connected to the first end portion of the fitting. The second conduit section is on the second or opposite side of the wall and it is connected to the second end portion of the fitting.

In a preferred embodiment, the end portions of the fitting include radially outwardly opening girth grooves spaced axially outwardly from the wall and the ring portion of the fitting. A ring seal (e.g. O-ring) is positioned in each girth groove. The conduit sections slip onto the end portions of the fitting and the rings contact inner surfaces of the conduit section. The fitting may be adapted to receive an electrical conduit.

According to a method aspect of the invention, an expansion tool is moved axially through the inside of the fitting. The expansion tool exerts a radially outwardly directed force on the ring portion of the fitting, causing it to expand and remain expanded so that there is a tight interference fit between it and the sidewall in the opening of the wall. This fit functions to secure the fitting to the wall and also provides a fluid tight seal between the fitting and the sidewall of the opening. The inside diameter of the ring portion of the fitting is smaller than the of the tubular end portions of the fitting an appreciable amount. Movement of the expansion tool through the ring portion of the fitting increases the inside diameter of the ring portion of the fitting, but never to such an extent that the tooling expands the inside diameters of the end portions of the fitting. Thus, the end portions of the fitting may be sized for proper connection of the conduit sections to them and this sizing of the end portions of the fitting is not disturbed by the expansion used to connect the fitting to the wall.

Other objects, advantages and features of the invention will become apparent from the description of the best mode set forth below, from the drawings, from the claims and from the principles that are embodied in the specific structures that are illustrated and described.

BRIEF DESCRIPTION OF THE SEVERAL VIEWS OF THE DRAWING

In the drawings, like reference numerals refer to like-parts throughout the several views, and.

PRIOR ART INSTALLATIONS

Figure 1:
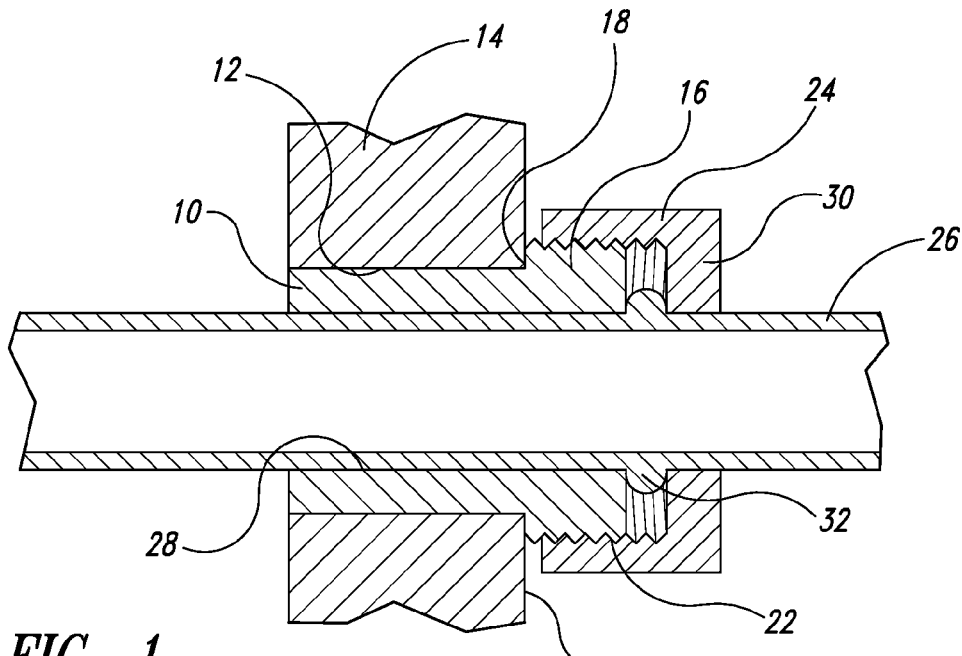
FIG. 1 is an axial sectional view of a prior art fitting in an opening in a wall, showing a conduit extending through the fitting and connector connecting the conduit to the fitting.
Figure 2:
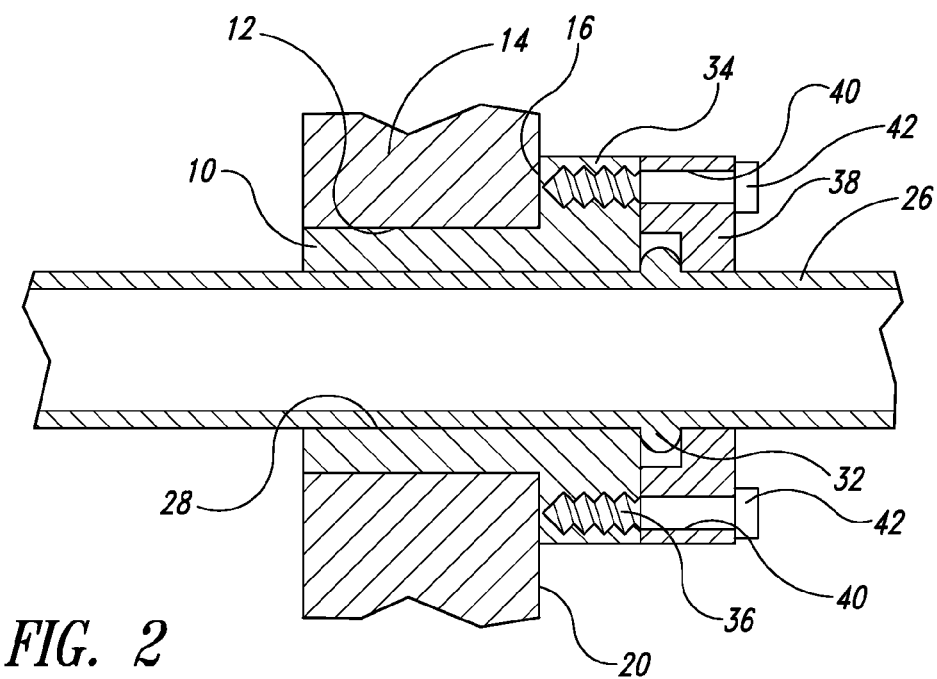
FIG. 2 is a view like FIG. 1 of a second prior art fitting, showing another form of connector connecting the conduit to the fitting.

FIGS. 1 and 2 of the drawing are in substance identical to FIGS. 30 and 31 of the aforementioned U.S. Pat. No. 5,096, 349. FIG. 1 shows a grommet 10 within an opening 12 in a wall 14. Grommet 10 is installed by radial expansion in a way that is described in detail in U.S. Pat. No. 5,096,349. Grommet 10 includes an enlarged head 16 presenting a shoulder 18 against the wall surface 20 where it immediately surrounds the opening 12. Head 16 is threaded at its outer periphery 22. These threads may receive the internal threads of a retainer nut 24. In FIG. 1, the retainer nut is shown to be used with a length of tubing 26, which fits into the center opening 28 of the grommet. A radial wall portion 30 on nut 24 bears against a radial flange 32 that is formed on the tubing 26.

FIG. 2 shows a similar installation. However, in this installation, the head 34 includes a plurality of internally threaded axial openings 36. A clamp washer 38 is shown positioned against the radial flange 32 on the tube 26. Openings 40 are provided in the washer 38. These openings 40 are equal in number and spacing to the threaded openings 36. Screw fasteners 42 are inserted through the openings 40 and are threaded into the openings 36, to secure the clamp washer 38 against the head 34.

Another prior art embodiment includes threaded openings which are oriented to extend radially through the head 16. These openings receive set screws which extend radially inwardly from the sidewall of the cap 24. The set screws and openings are used in place of the threads 22 shown in FIG. 1.

DETAILED DESCRIPTION OF THE INVENTION

Figure 3:
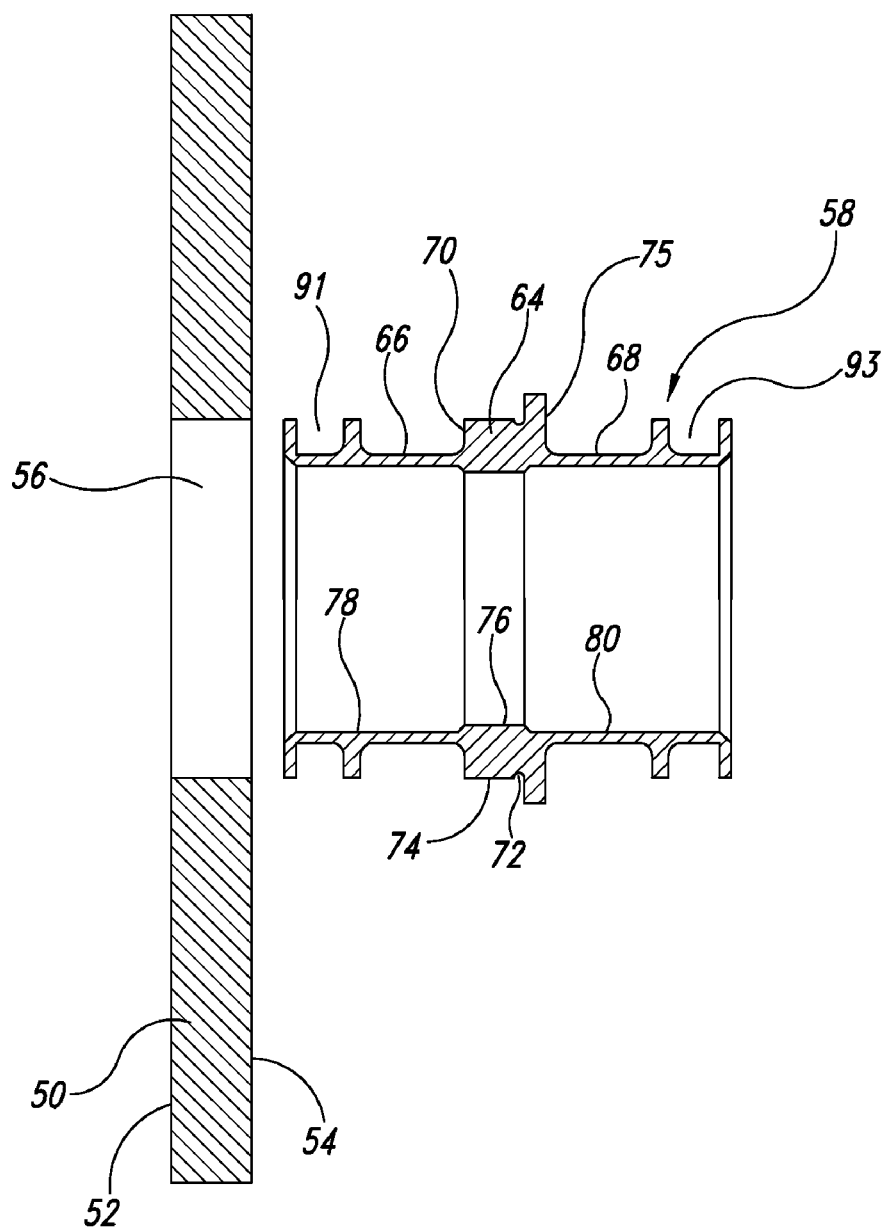
FIG. 3 is a longitudinal sectional view taken through a portion of a workpiece and an embodiment of the present invention that is securable an opening in the workpiece, such view showing the fitting spaced axially from the opening in the workpiece.
Figure 4:
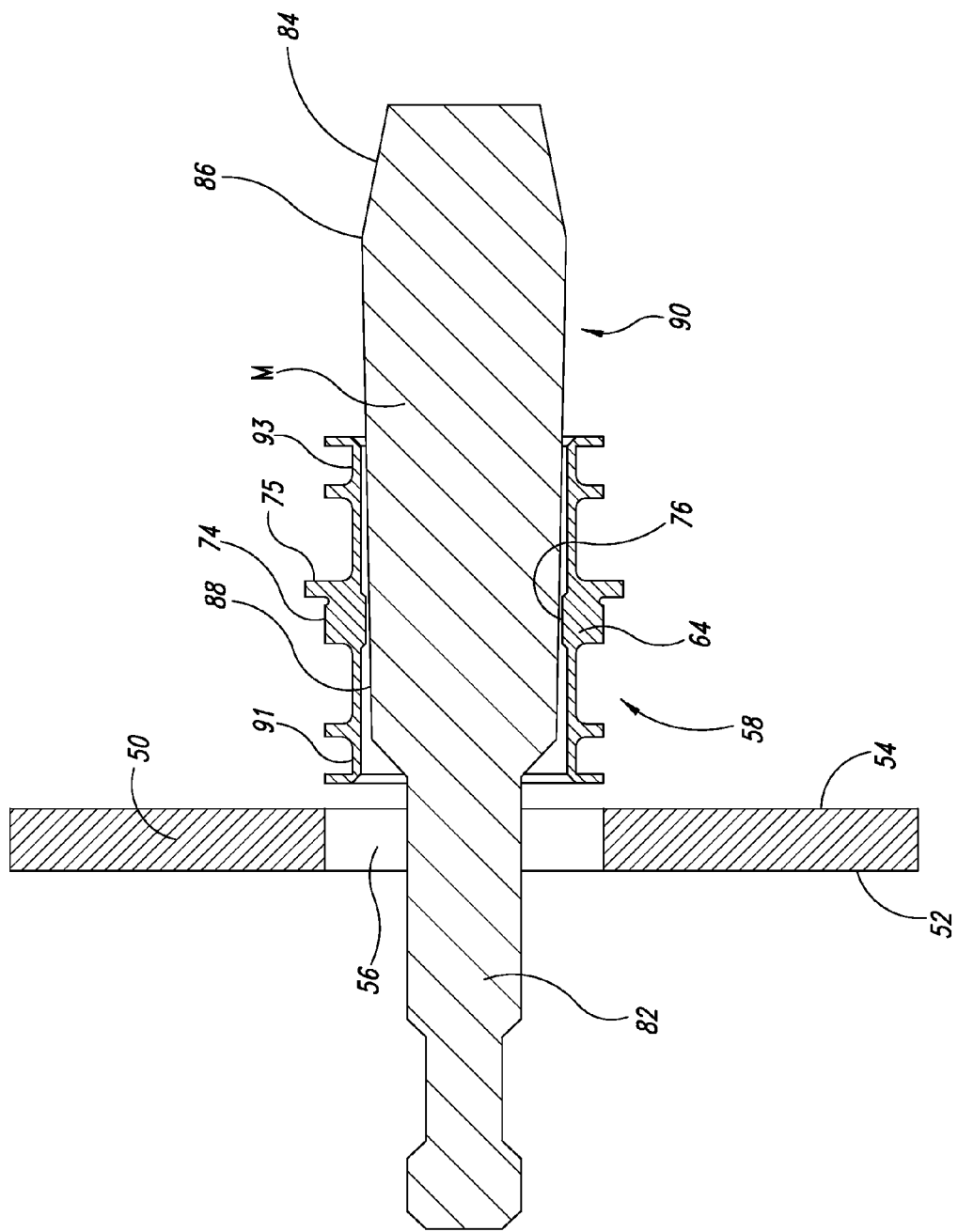
FIG. 4 is a view like FIG. 3, but showing a mandrel inside of the fitting and the base end of the mandrel extending through the opening in the workpiece.
Figure 5:
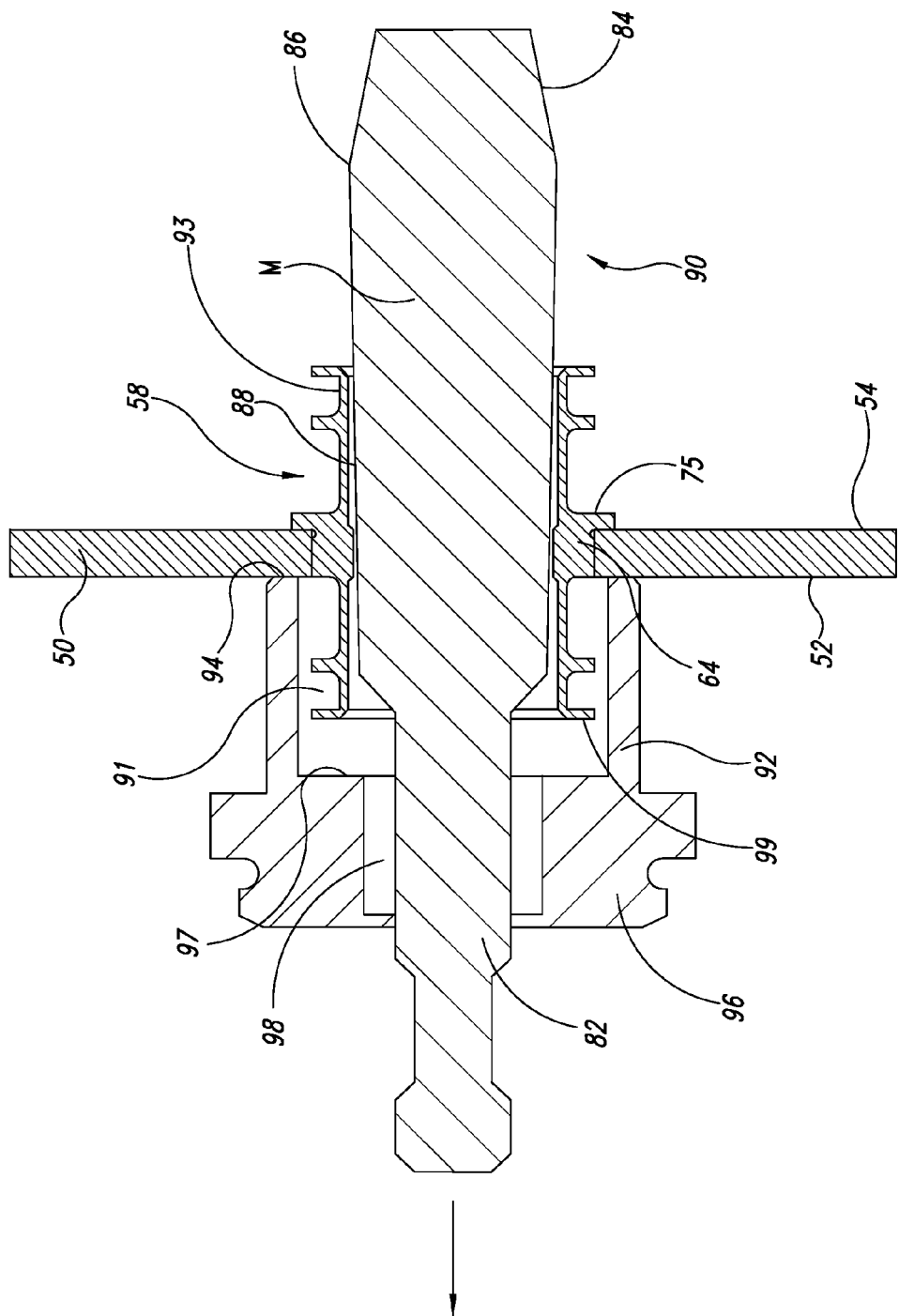
FIG. 5 is a view like FIG. 4, but further showing the fitting positioned within the opening in the workpiece, and showing a nose piece portion of a puller unit surrounding the fitting and mandrel, with its outer end positioned against the workpiece.
Figure 6:
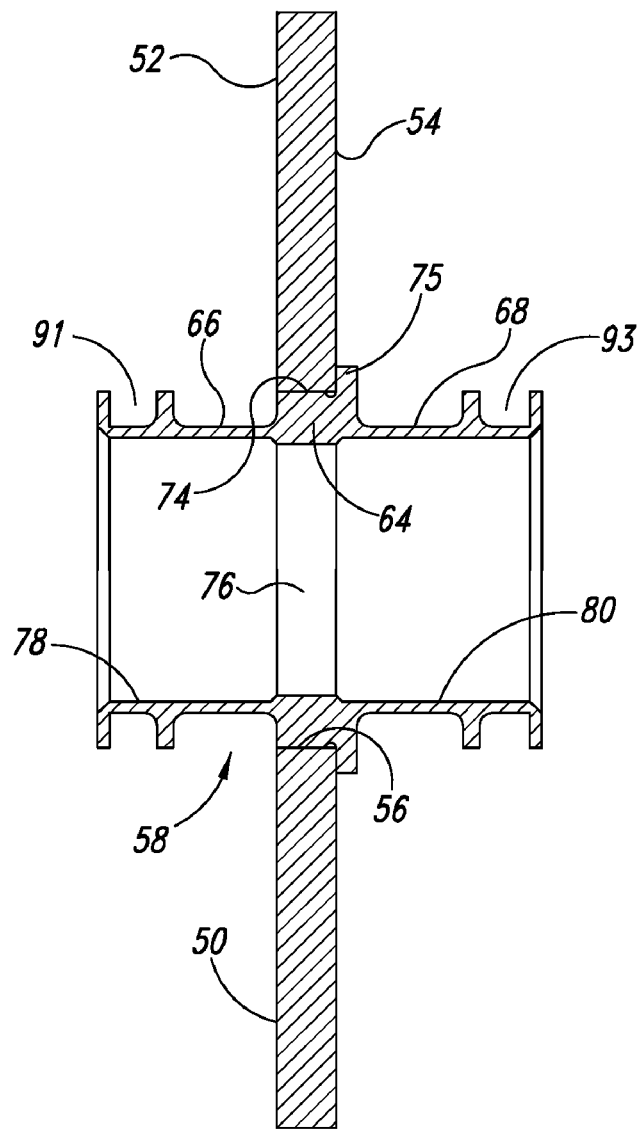
FIG. 6 is a view like FIG. 3, but showing the fitting positioned within the opening in the workpiece.
Figure 7:
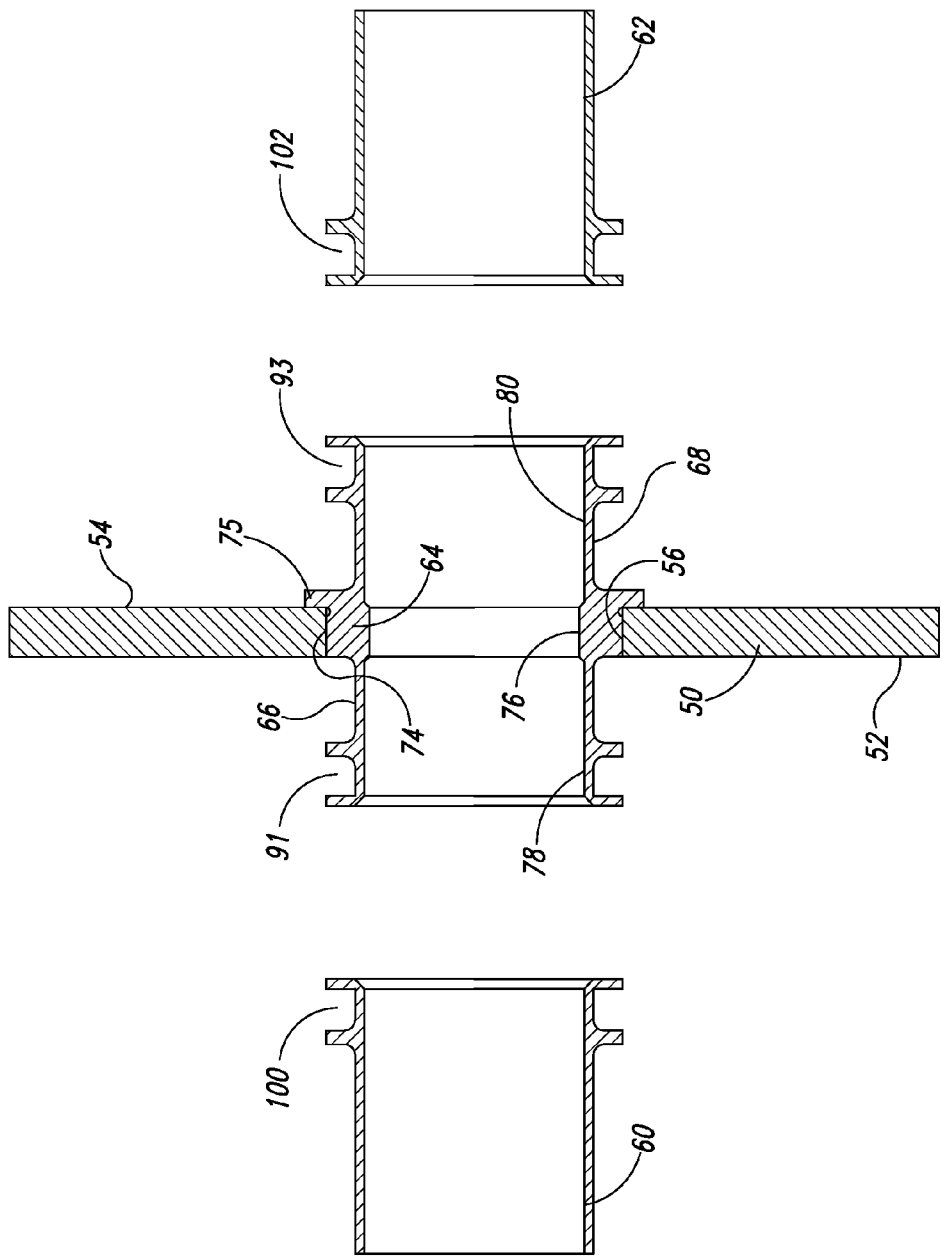
FIG. 7 is a view like FIG. 6, showing end portions of two conduits positioned axially outwardly from opposite end portions of the fitting.

FIGS. 3-5 show a wall or bulkhead 50 that includes a first side 52, a second side 54 and an axial opening 56 that extends through the wall 50, between the two sides 52, 54. In FIG. 3, a first fitting embodiment of the present invention, designated 58, is shown spaced axially from the opening 56. FIG. 6 shows the fitting 58 positioned inside the opening 56 and secured to the wall 50. FIG. 7 is a view like FIG. 6, but further includes end portions of first and second conduits 60, 62. First conduit 60 is on the first side of the wall 50. The second conduit 62 is on the opposite or second side of the wall 50.

In preferred form, fitting 58 comprises a ring portion 64 that is positioned axially between first and second end portions 66, 68. Ring portion 64 includes a first end 70 and a second end 72. A radial flange 75 extends radially outwardly from the fitting 58 adjacent the second end 72 of the ring portion 64. Ring portion 64 includes an outer diameter 74 and an inner diameter 76. End portions 66, 68 include inner diameters 78, 80 which may be substantially equal to each other, but are larger in diameter than the inner diameter 76 of the ring portion 64.

As shown by FIGS. 4 and 5, the fitting 58 is inserted into the opening 58, first end portion 66 first. The first end portion 66 is aligned with the opening 56 and then the end portion 66 is moved towards and through the opening 56. Eventually, the first end 70 of ring portion 64 is moved into and through the opening 56.

The outer diameter 74 of ring portion 64 is sized so that it is snugly fittable within the opening 56. The fitting 58 is moved axially until the flange 75 contacts the wall surface 54. This position of the flange 75 against the wall surface 54 is shown in FIGS. 5 and 6. When flange 75 is against surface 54, the ring portion 64 is within the opening 56. End portion 66 projects axially outwardly from the ring portion 64 on the sidewall 50 which includes surface 52. End portion 68 projects axially outwardly from ring portion 64 on the side of the wall 50 that includes surface 54. In a manner that will be hereinafter described, a split sleeve and mandrel or a mandrel only are moved axially through the fitting 58 for expanding the ring portion 64 within the opening 56. When a mandrel only is used, the mandrel may be a solid mandrel or may be a split mandrel. When a split sleeve is used, the split sleeve contacts the inner surface 76 of the ring portion 64. When a mandrel only is used (solid or split), the outer surface of the mandrel contacts the inner surface 76. Axial movement of the mandrel through the split sleeve, or axial movement of the mandrel alone, causes a radial expansion of ring portion 64, causing its inner and outer diameters to increase and form a tight interference fit with the wall of opening 56. This expansion is sufficient to secure the ring portion 64 within the opening 56, and the fitting 58 to the wall 50. Preferably, the amount of expansion applied is sufficient to cold work the material in the wall 50 surrounding the opening 56, for fatigue enhancement of the material. Expansion of the ring portion 64 will increase both its inner and outer diameters. However, its inner diameter is never expanded to such an extent that the expansion tooling expands the inner surfaces 78, 80 of the end portions 66, 68 of the fitting 58. That is, only the ring portion 64 of the fitting 58 and where it is attached to an end portion are radially expanded. The end portions 66, 68 are sized to perform their function as connector components and the original size is not changed by movement of the expansion tooling through the fitting 58 by an amount that is detrimental to the function.

U.S. Pat. No. 5,245,743, granted Sep. 21, 1993, to Michael A. Landy, Roger T. Bolstad, Charles A. Copple, Darryl E. Quincey, Eric T. Easterbrook, Leonard F. Reid and Louis A. Champoux discloses the use of a split sleeve and mandrel for installing a fitting in an opening in a wall. It discloses use of both a solid mandrel (FIGS. 22 and 23) and a split mandrel (column 8, lines 51-55). The mandrel only process, using a split mandrel, is disclosed by U.S. Pat. No. 4,665,732, granted May 19, 1987, to Franciscus Hogenhout, and assigned to West Coast Industries, Inc. The disclosures of these patents are incorporated by reference herein, for everything that they disclose.

FIGS. 4 and 5 show a mandrel M inside of the fitting. Mandrel M includes a base end 82, a tapered nose section 84, a maximum diameter region 86, a reduced diameter section 88 and a transitional section 90. In the transitional section 90, the diameter increases from the diameter in the section 88 up to the maximum diameter 86. As illustrated in FIGS. 4 and 5, the lesser diameter portion 88 of the mandrel is sized to fit and pass through the center opening in the fitting 58. In the section 88, the inside diameter 76 of the ring portion 64 is slightly larger than the diameter of the mandrel.

The mandrel M is moved into the fitting 58, in the manner illustrated in FIGS. 4 and 5. Then, the base end 82 of the mandrel M is secured to a moveable member within a puller unit. The puller unit includes a nose piece 92 (FIG. 5) which has an end 94 that is adapted to make contact with the workpiece 50. The puller is not shown but it may be similar to the puller that is disclosed in U.S. Pat. No. 5,218,854, granted Jun. 15, 1993 to Richard Z. Jarzebowicz, Joy S. Ransom, Eric T. Easterbrook, Charles M. Copple and Leonard F. Reid. As disclosed in the patent, the base end 82 of the mandrel M is adapted to be engaged by the outer end portion of an axially moveable push-pull member that is moved hydraulically forwardly and rearwardly.

Referring to FIG. 5, the nose piece 92 includes a rear end portion 96 having a center opening 98. Center opening 98 is sized to receive the maximum diameter section 86 of the mandrel M. The puller (not shown) is operated to pull on the base 82 of the mandrel M, to pull the mandrel M through the fitting 58. Initially, the mandrel section 88 will pass freely through the interior of the fitting 58. This will happen until the transition section 90 approaches the inner diameter 76 of the ring portion 64. As the section 90 passes through the ring portion 64, it progressively applies a radially outwardly directed force on the ring portion 64. This radial force increases the diameter of the ring portion 64 and moves its outer surface 74 against the inner surface of the opening 56. Ring portion 64 imposes a radially outwardly directed force on the material of wall 50 that immediately surrounds the opening 56. The ring portion 64 is expanded by the mandrel M an amount sufficient to plastically expand the ring portion 64 so that there is a tight interference fit between the surface 74 and the wall of the opening 56. The degree of expansion is preferably great enough to plastically expand the wall material 50 that immediately surrounds the opening 56. The first expansion, causing the interference fit, secures the fitting 58 in the opening 56. The additional expansion of the wall material surrounding the opening 56 provides fatigue enhancement in the wall material. As the mandrel M is being drawn through the fitting 58, the friction caused by contact of the transitional section 90 with the interior surface 76 of the ring portion 64 acts to pull the flange 75 tight against the wall 54. The moving mandrel M also causes a reacting force on the nose piece 92, moving the end surface 94 against the wall 50 on the side 52 opposite the flange 75.

The radial flange 75 is not an essential element. Nose piece 96 includes a radial surface 97. If the flange 75 is omitted, this surface 97 may be extended to where it contacts the end surface 99 of the fitting 58. This contact will prevent the fitting 58 from moving axially in response to the mandrel M being pulled through it.

When the sections 90 and 86 are being moved through the inside diameter 76 of the ring portion 64, the mandrel section 88 is moving through the opening 98. The mandrel M is pulled until the maximum diameter portion 86 has passed 10 through the opening 76. When this happens, the puller/mandrel assembly can be pulled away from the wall 50, leaving the fitting 58 installed in the wall, as shown by FIG. 6. At no time during the movement of the mandrel M through the fitting 58 does the transitional and maximum diameter sections 90, 86 of the mandrel M expand the inner surfaces 78, 80 of the end portions 66, 68 of the fitting 58 by a substantial amount. It is only the ring portion 64 that is contacted and expanded by the mandrel sections 90, 86 by a substantial amount. The inside and outside diameters of the end portions 66, 68 do not change in size or shape, except where they join the ring section 64. Accordingly, they can be designed for their function of connecting the fitting 58 to conduit sections 60, 62 on the opposite sides of the wall 50.

Figure 8:
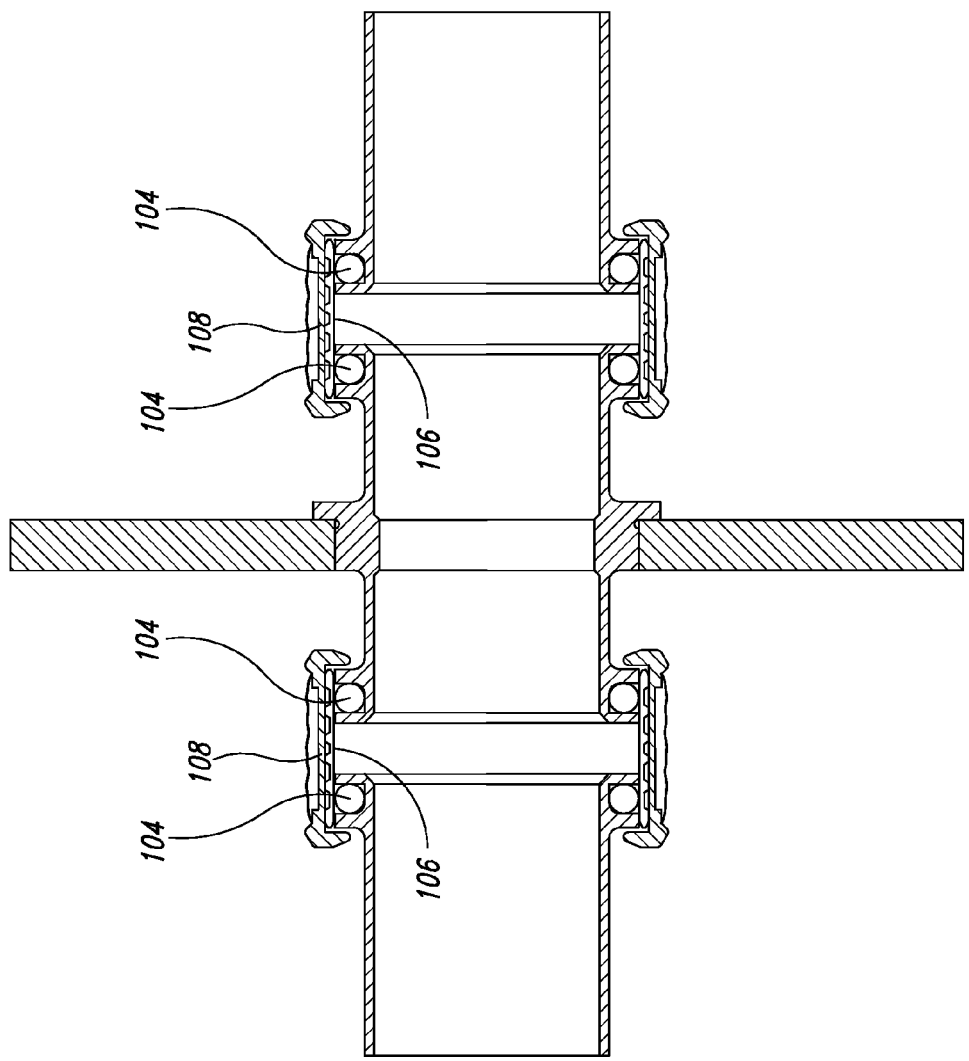
FIG. 8 is a view like FIG. 7, but showing O-rings in the girth grooves and clamp structure clamping the end portions of the fitting to adjacent end portions of the conduit sections.

As shown in FIGS. 3-8, the end portions 66, 68 include radially outwardly opening girth grooves or channels 91, 93 that are spaced axially outwardly from the ring portion 64. The conduit sections 60, 62 also include radially outwardly opening girth grooves or channels 100, 102. Channels 91, 93, 100, 102 are all constructed to receive O-ring seals 104, as shown by FIG. 8. A suitable clamp structure 106, 108 is provided to connect the end portions of the fitting to the end portions of the conduit sections. By way of typical but non-limitive example, the connection may be like the connection disclosed in U.S. Pat. No. 4,249,786, granted Feb. 10, 1981 to George A. Mahoff and assigned to Hydro-Flow Supply, Inc. See FIG. 4 of this patent, in particular. Because the connection and its parts are so well disclosed in U.S. Pat. No. 4,249,786, that disclosure will not be repeated herein in great detail. Rather, the contents of U.S. Pat. No. 4,249,786 are incorporated herein by this specific reference.

FIGS. 9-12 show modified constructions of the wall fitting. The fitting 110 (FIG. 9) shows a construction very similar to the construction shown by FIGS. 3-8. However, the radially outwardly directed girth grooves are replaced by radially inwardly directed girth grooves 112, 114 that are adapted to receive and connect to a different type of component at the end of the conduit sections (not shown).

Figure 10:
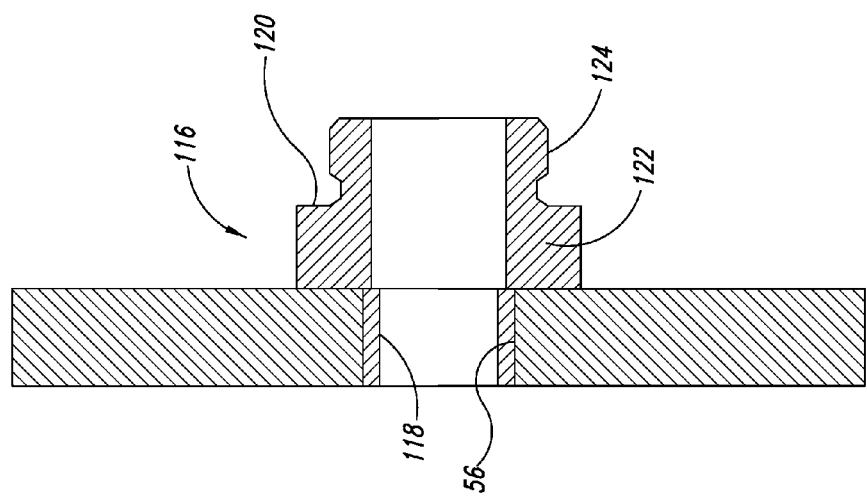
FIG. 10 is a view similar to FIG. 9, but showing a modified construction of the fitting.
Figure 9:
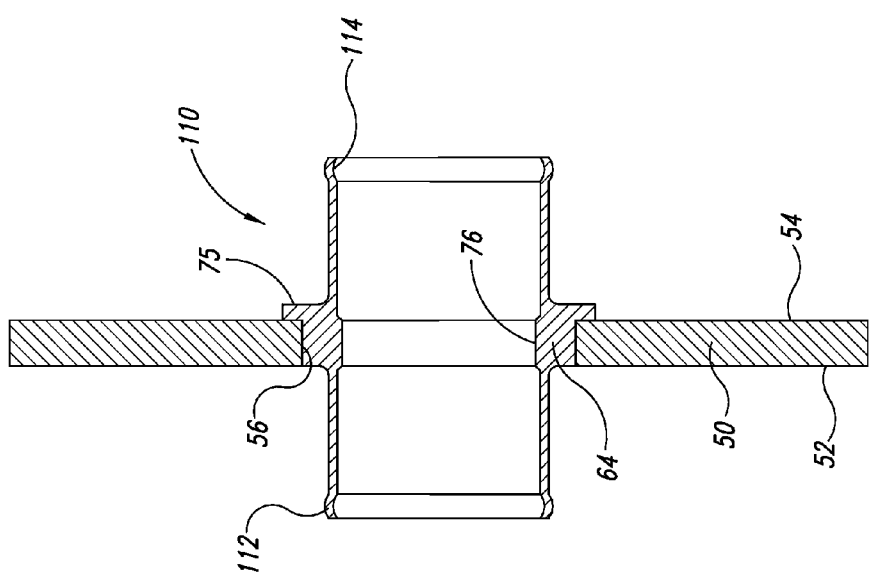
FIG. 9 is a view like FIG. 6, but showing a modified construction of the end portions of the fitting.

FIG. 10 shows a fitting 116 that includes a ring portion 118 that is in the wall opening 56, and a single end portion 120. End portion 120 includes a radial flange 122 and a threaded end portion 124. The threads may be like the threads on end portion 16 shown in FIG. 1. In this embodiment, like in the other embodiments, the inner diameter of the ring portion 118 is smaller than the outer diameter of the ring portion, for the same reason as stated above in connection with the other embodiments.

Figure 11:
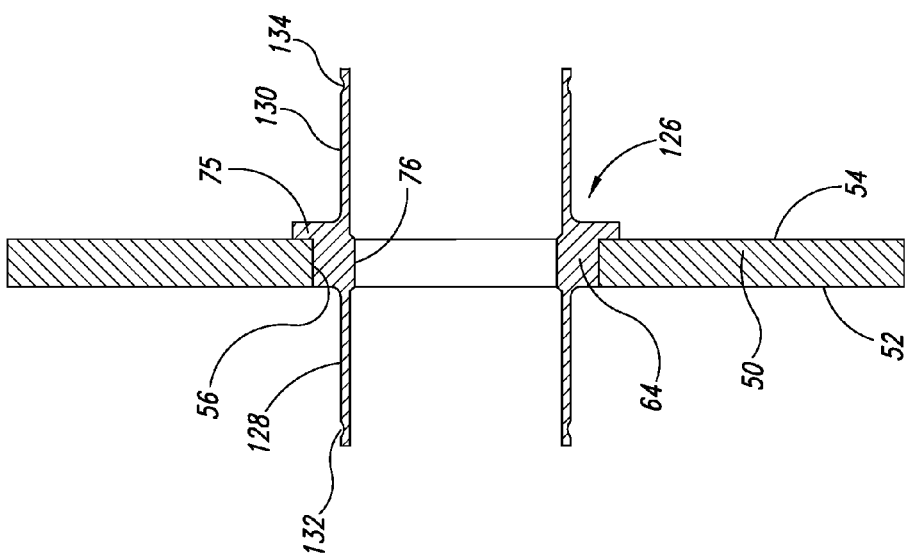
FIG. 11 is a view like FIGS. 6, 9 and 10, but of a further modified construction of the fitting.

The fitting 126 is shown by FIG. 11 has two end portions 128, 130, extending axially outwardly from the ring portion 64. The end portions 128, 130 show a modified construction of the radially outwardly opening girth rings 132, 134.

Figure 12:
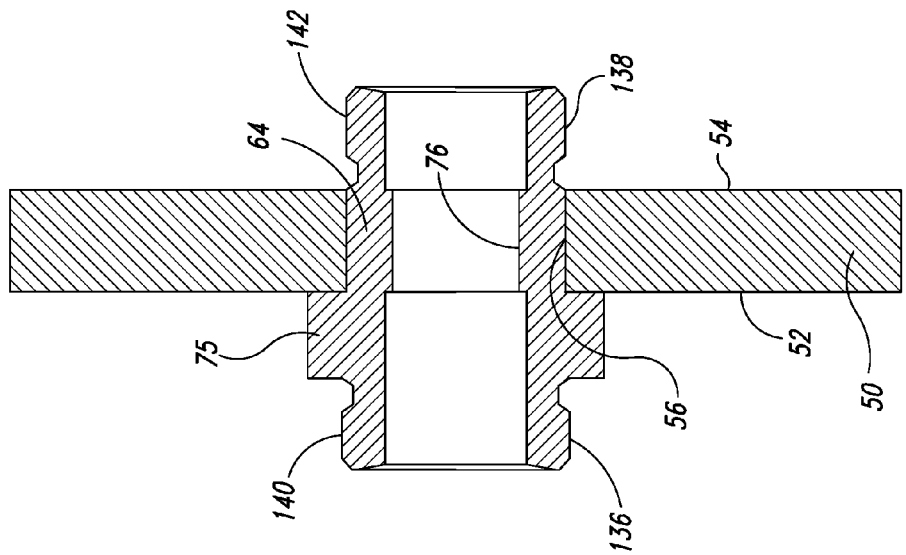
FIG. 12 is a view like FIGS. 6 and 9-11, but showing yet another construction of the fitting.

FIG. 12 shows a ring portion 64 and two end portions 136, 138. In this embodiment, the ring portion 64 has a smaller inside diameter than the end portions 136, 138 for the previously-stated reason. In this embodiment, the end portions 136, 138 have external threads 140 142 for use in connecting them to the conduit sections. The flange 75 may have a hexagonal external shape, i.e. like a hex nut. This will enable it to be grasped by a wrench when fittings are being screwed onto the end threads 140, 142.

The illustrated embodiments are only examples of the present invention and, therefore, are non-limitive. It is to be understood that many changes in the particular structure, materials and features of the invention may be made without departing from the spirit and scope of the invention. Therefore, it is my intention that my patent rights not be limited by the particular embodiments illustrated and described herein, but rather are to be determined by the following claims, interpreted according to accepted doctrines of patent claim interpretation, including use of the doctrine of equivalents and reversal of parts.

What is claimed is:

1. A fitting installable in an opening in a structural work piece having a first side and a second side, the fitting comprising:

a ring portion having an outer circumference and an inner circumference, the ring portion adapted to be radially expanded so as to establish an interference fit between the outer circumference of the ring portion and a portion of the work piece defining the opening;

a flange dimensioned so as to abut against and extend in an outward radial direction from the ring portion along the work piece when the ring portion is positioned in the opening in the work piece; and a first coupling member extending from a first side of the ring portion such that at least a portion of the ring portion is between the flange and the first coupling member, the first coupling member being sized to pass through the opening in the work piece and having a maximum outer circumference that is smaller than the outer circumference of the portion of the ring portion before and after the ring portion has been radially expanded, the first coupling member having at least a minimum inner circumference and a first end section, the minimum inner circumference being larger than the inner circumference of the ring portion before and after expansion of the ring portion, the first end section configured to couple to a first device on the first side of the work piece.

2. The fitting of claim 1, wherein the first end section is configured to couple to a conduit of the first device after the ring portion has been radially expanded so as to establish an interference fit between the outer circumference of the ring portion and the portion of the work piece defining the opening.

3. The fitting of claim 1, further comprising a second coupling member extending from a second side of the ring portion opposing the first side of the ring portion, the second coupling member having a second end section configured to couple to a second device on the second side of the work piece, and the second end section is configured to couple to a conduit of the second device after the ring portion has been radially expanded so as to establish an interference fit between the outer circumference of the ring portion and the portion of the work piece defining the opening.

4. The fitting of claim 1, further comprising a girth groove located at least proximate to the first end section of the first coupling member.

5. The fitting of claim 1, wherein the ring portion is positioned substantially midway between the first end section and a second end section of a second coupling member extending from a second side of the ring portion.

6. The fitting of claim 1, wherein the ring portion is radially expandable so as to establish the interference fit without radially expanding to any significant extent at least one of the first end section and a second end section of a second coupling member extending from a second side of the ring portion.

7. The fitting of claim 1, wherein the ring portion has a wall thickness defined between the inner circumference and the outer circumference, the wall thickness is larger than a wall thickness of a tubular body of the first coupling member.

8. The fitting of claim 1, wherein a tubular body of the first coupling member has a maximum wall thickness that is smaller than a wall thickness of an end of the ring portion connected to the first coupling member.

9. The fitting of claim 1, wherein the ring portion has a thick-walled section, the first end section of the first coupling member is spaced apart from the ring portion, a thin-walled section of the first coupling member is between the first end section and the ring portion.

10. The fitting of claim 9, wherein the first end section and the ring portion protrude radially outward from the thin-walled section of the first coupling member.

11. The fitting of claim 1, further comprising a through-hole being defined by the ring portion, the first coupling member, and a second coupling member extending from a second side of the ring portion, the flange being positioned between the ring portion and the second coupling member.

12. The fitting of claim 1, wherein the flange extends radially outward from a side of the ring portion.

13. A fitting installable in an opening in a work piece, the fitting comprising:

a ring portion including an outer surface defining an outer circumference, an inner surface defining an inner circumference, and a wall thickness defined by the outer surface and the inner surface;

a flange extending outwardly from the ring portion and along a portion of the work piece at least proximate to the opening when at least a portion of the ring portion has been positioned in the opening; and a longitudinally-extending first end portion projecting outwardly from a first side of the ring portion, the ring portion positioned between the flange and the first end portion, the first end portion having a minimum inner circumference, an outer circumference, and a first coupling feature for coupling to a first component, the minimum inner circumference of the first end portion being larger than the inner circumference of the ring portion, the outer circumference of the first end portion being smaller than the outer circumference of the ring portion.

14. The fitting of claim 13, further comprising a through-hole defined by the ring portion, the first end portion, and a second end portion projecting outwardly from a second side of the ring portion, the inner surface of the ring portion defines a narrowest section of the through-hole.

15. The fitting of claim 13, wherein the ring portion extends radially inward and radially outward of an adjacent portion of the first end portion.

16. The fitting of claim 13, wherein the wall thickness of the ring portion is larger than a wall thickness of a tubular body of the first end portion.

17. The fitting of claim 13, wherein the ring portion is radially expandable using a mandrel so as to form an interference fit between the outer surface of the ring portion and the work piece without radially expanding to any significant extent a free end of the first end portion.

18. The fitting of claim 13, wherein the first end portion has a maximum wall thickness that is less than a maximum wall thickness of the ring portion.

19. The fitting of claim 13, wherein the first coupling feature of the first end portion is spaced apart from the ring portion, a tubular section of the first end portion is between the first coupling feature and the ring portion, the first coupling feature and the ring portion extend radially outward from the tubular section.

20. The fitting of claim 19, wherein the ring portion has a maximum wall thickness that is larger than a maximum wall thickness of the tubular section.

21. The fitting of claim 19, wherein the tubular section of the first end portion extends along most of a distance between a free end of the first end portion and the ring portion.

22. A fitting installable in an opening in a work piece, the fitting comprising:

a ring portion including an outer surface defining an outer circumference, an inner surface defining an inner circumference, and a wall thickness defined by the outer surface and the inner surface;

a flange adapted to extend outwardly along a portion of the work piece at least proximate to the opening when at least a portion of the ring portion has been positioned in the opening;

a longitudinally-extending first end portion projecting outwardly from a first side of the ring portion, the ring portion positioned between the flange and the first end portion, the first end portion having a minimum inner circumference, an outer circumference, and a first coupling feature for coupling to a first component, the minimum inner circumference of the first end portion being larger than the inner circumference of the ring portion, the outer circumference of the first end portion being smaller than the outer circumference of the ring portion; and a through-hole defined by the ring portion, the first end portion, and a second end portion projecting outwardly from a second side of the ring portion, the inner surface of the ring portion defines a narrowest section of the through-hole, wherein the flange is positioned between the ring portion and the second end portion.

23. A fitting installable in an opening in a work piece, the fitting comprising:
   a ring portion including an outer surface defining an outer circumference, an inner surface defining an inner circumference, and a wall thickness defined by the outer surface and the inner surface;
   a flange adapted to extend outwardly along a portion of the work piece at least proximate to the opening when at least a portion of the ring portion has been positioned in the opening; and
   a longitudinally-extending first end portion projecting outwardly from a first side of the ring portion, the ring portion positioned between the flange and the first end portion, the first end portion having a minimum inner circumference, an outer circumference, and a first coupling feature for coupling to a first component, the minimum inner circumference of the first end portion being larger than the inner circumference of the ring portion, the outer circumference of the first end portion being smaller than the outer circumference of the ring portion, wherein the first coupling feature includes external threads.

24. A fitting installable in an opening in a work piece, the fitting comprising:
   a ring portion including an outer surface defining an outer circumference, an inner surface defining an inner circumference, and a wall thickness defined by the outer surface and the inner surface;
   a flange adapted to extend outwardly along a portion of the work piece at least proximate to the opening when at least a portion of the ring portion has been positioned in the opening;
   a longitudinally-extending first end portion projecting outwardly from a first side of the ring portion, the ring portion positioned between the flange and the first end portion, the first end portion having a minimum inner circumference, an outer circumference, and a first coupling feature for coupling to a first component, the minimum inner circumference of the first end portion being larger than the inner circumference of the ring portion, the outer circumference of the first end portion being smaller than the outer circumference of the ring portion; and an inner end of a second end portion being connected to the ring portion and an opposing outer end of the second end portion including a second coupling feature, and a thin-walled tubular body extending between the inner end and the opposing outer end.

25. A fitting for installation in an opening in a work piece, the fitting comprising:
   an expandable ring portion sized to be positioned in the opening of the work piece, the expandable ring portion having an outer circumference;
   a longitudinally-extending end portion sized to pass through the opening in the work piece, the end portion positioned on a side of the expandable ring portion and having a coupling feature configured to couple to a component, the end portion having a maximum outer circumference that is smaller than the outer circumference of the ring portion before and after the ring portion has been expanded;
   a flange extending outwardly from the expandable ring portion and along a portion of the work piece proximate to the opening of the workpiece when at least a portion of the expandable ring portion has been positioned in the opening in the work piece; and
   a passageway formed by the expandable ring portion and the end portion, the expandable ring portion extends radially inward of the end portion such that an interference fit is formed between the expandable ring portion and the work piece when the expandable ring portion is expanded by a mandrel passing through the passageway.

26. The fitting of claim 25, wherein the coupling feature is spaced apart from the expandable ring portion a sufficient distance to substantially prevent expansion of the coupling feature when the interference fit is formed between the expandable ring portion and the work piece.

27. The fitting of claim 25, wherein the end portion has a thin-walled body extending between the coupling feature and the expandable ring portion.

28. The fitting of claim 25, wherein the expandable ring portion is configured to cause cold working of the work piece without causing expansion of the coupling feature when the expandable ring portion is expanded by the mandrel.

29. The fitting of claim 25, wherein a section of the end portion extending between the coupling feature and the ring portion has a maximum wall thickness that is smaller than a wall thickness of an end of the ring portion connected to the end portion and smaller than a maximum wall thickness of the coupling feature.

30. The fitting of claim 25, wherein the passageway is further defined by an additional end portion extending outwardly from a side of the ring portion opposite the longitudinally-extending end portion, wherein the flange is positioned between the ring portion and the additional end portion.

31. The fitting of claim 25, wherein the flange extends radially outward from a side of the ring portion.

* * * * *